United States Patent
Wada et al.

(10) Patent No.: US 8,322,934 B2
(45) Date of Patent: Dec. 4, 2012

(54) CAMERA DEVICE AND DRIVE MECHANISM

(75) Inventors: Jyouji Wada, Kanagawa (JP); Tetsurou Kajino, Tokyo (JP); Tamotsu Uchida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 280 days.

(21) Appl. No.: 12/667,100

(22) PCT Filed: Jun. 30, 2008

(86) PCT No.: PCT/JP2008/001709
§ 371 (c)(1),
(2), (4) Date: Dec. 29, 2009

(87) PCT Pub. No.: WO2009/004787
PCT Pub. Date: Jan. 8, 2009

(65) Prior Publication Data
US 2010/0192712 A1 Aug. 5, 2010

(30) Foreign Application Priority Data
Jul. 4, 2007 (JP) .................. 2007-176142

(51) Int. Cl.
*F16H 21/00* (2006.01)
*F16H 25/08* (2006.01)
*F16H 37/16* (2006.01)
*G03B 17/00* (2006.01)
(52) U.S. Cl. ............ 396/427; 74/425; 74/22 R
(58) Field of Classification Search ............ 74/22 R, 74/23, 89.14, 425; 396/72, 75, 86, 427
See application file for complete search history.

(56) References Cited

U.S. PATENT DOCUMENTS

| 3,529,789 A | 9/1970 | Morgan |
| 5,222,402 A * | 6/1993 | White et al. ............ 74/89.14 |
| 5,779,343 A | 7/1998 | Denley |

(Continued)

FOREIGN PATENT DOCUMENTS

JP H05-87356 U 11/1993

(Continued)

OTHER PUBLICATIONS

International Search Report for PCT/JP2008/001709.
European Search Report for Application No. 08790108.8 -2217/ 2169262 dated May 15, 2012.

*Primary Examiner* — Justin Krause
(74) *Attorney, Agent, or Firm* — Pearne & Gordon LLP

(57) ABSTRACT

A drive mechanism (1) of a camera apparatus includes a worm gear (4) to which a rotational driving force of a drive motor (2) is transmitted, a worm wheel (6) around which a helical gear (5) is formed to engage with the worm gear (4), and a support frame (7) which supports the worm wheel (6) rotatably and movably along a rotation axis. A rotational driving force of the worm gear (4) is transmitted to the worm wheel (6) with reduced gear ratio. An externally threaded portion (10) of a shaft portion (8) of the worm wheel (6) is engaged with an internally threaded portion in a supporting hole (14) of the support frame (7), so that the shaft portion (8) moves along the rotation axis when the worm wheel (6) rotates. Consequently, the rotational driving force transmitted to the worm wheel (6) is converted into a linear thrust force along the rotation axis. This makes it possible to provide a camera apparatus which can develop a larger thrust force and adjust an amount of travel more finely.

15 Claims, 8 Drawing Sheets

U.S. PATENT DOCUMENTS

| | | | |
|---|---|---|---|
| 5,993,095 A * | 11/1999 | Harris | 400/636.2 |
| 6,322,146 B1 * | 11/2001 | Fisher, Jr. | 297/362.14 |
| 7,410,201 B1 * | 8/2008 | Wilson et al. | 296/146.16 |
| 2004/0206195 A1 * | 10/2004 | Landskron et al. | 74/89.14 |
| 2004/0206196 A1 * | 10/2004 | Gabriel | 74/89.14 |
| 2006/0230852 A1 | 10/2006 | Burton | |

FOREIGN PATENT DOCUMENTS

| | | |
|---|---|---|
| JP | 10-026215 A | 1/1998 |
| JP | 2003-274229 A | 9/2003 |
| JP | 2004-081444 A | 3/2004 |
| JP | 2005-077601 A | 3/2005 |

* cited by examiner

[FIG.1]
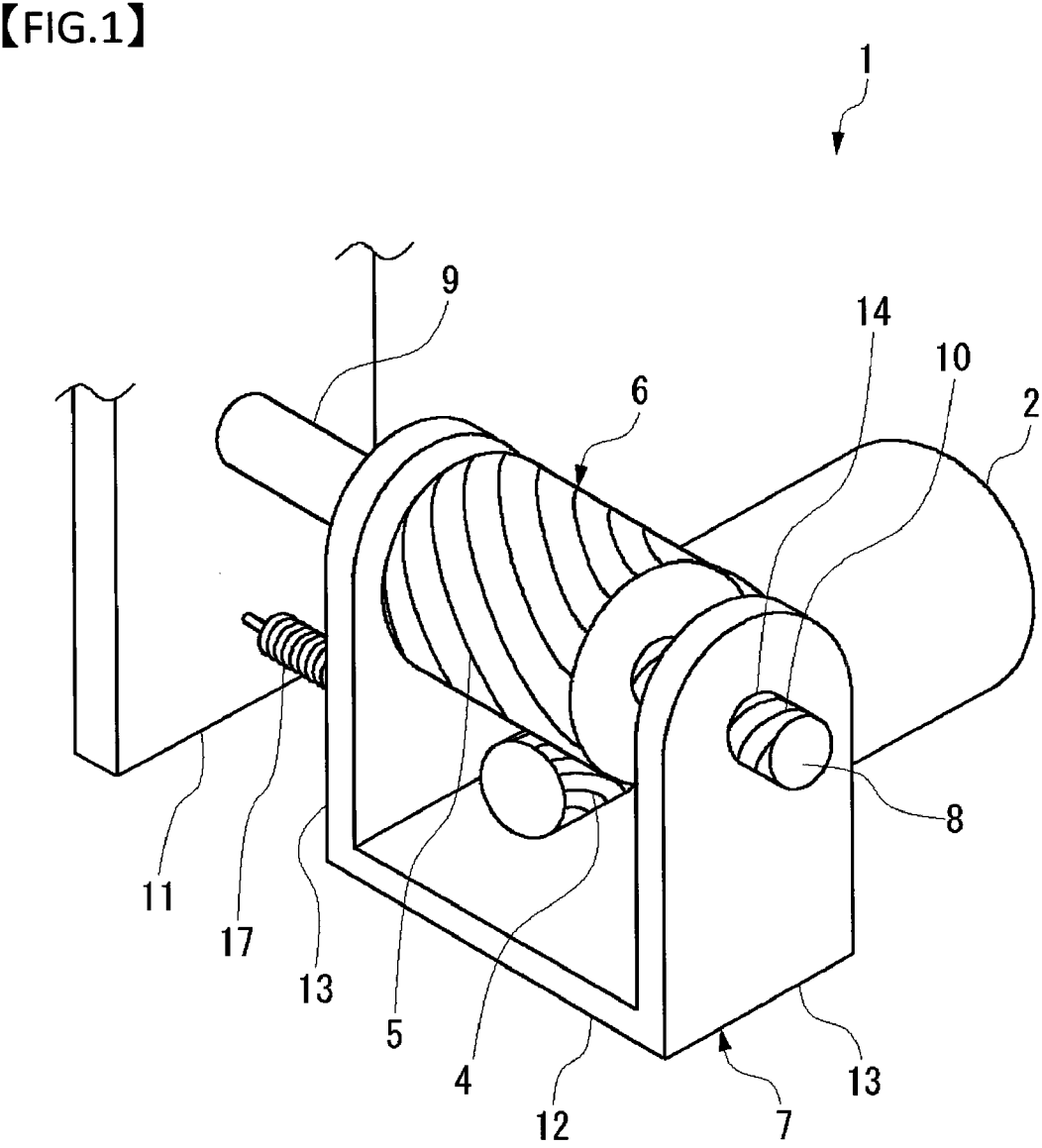

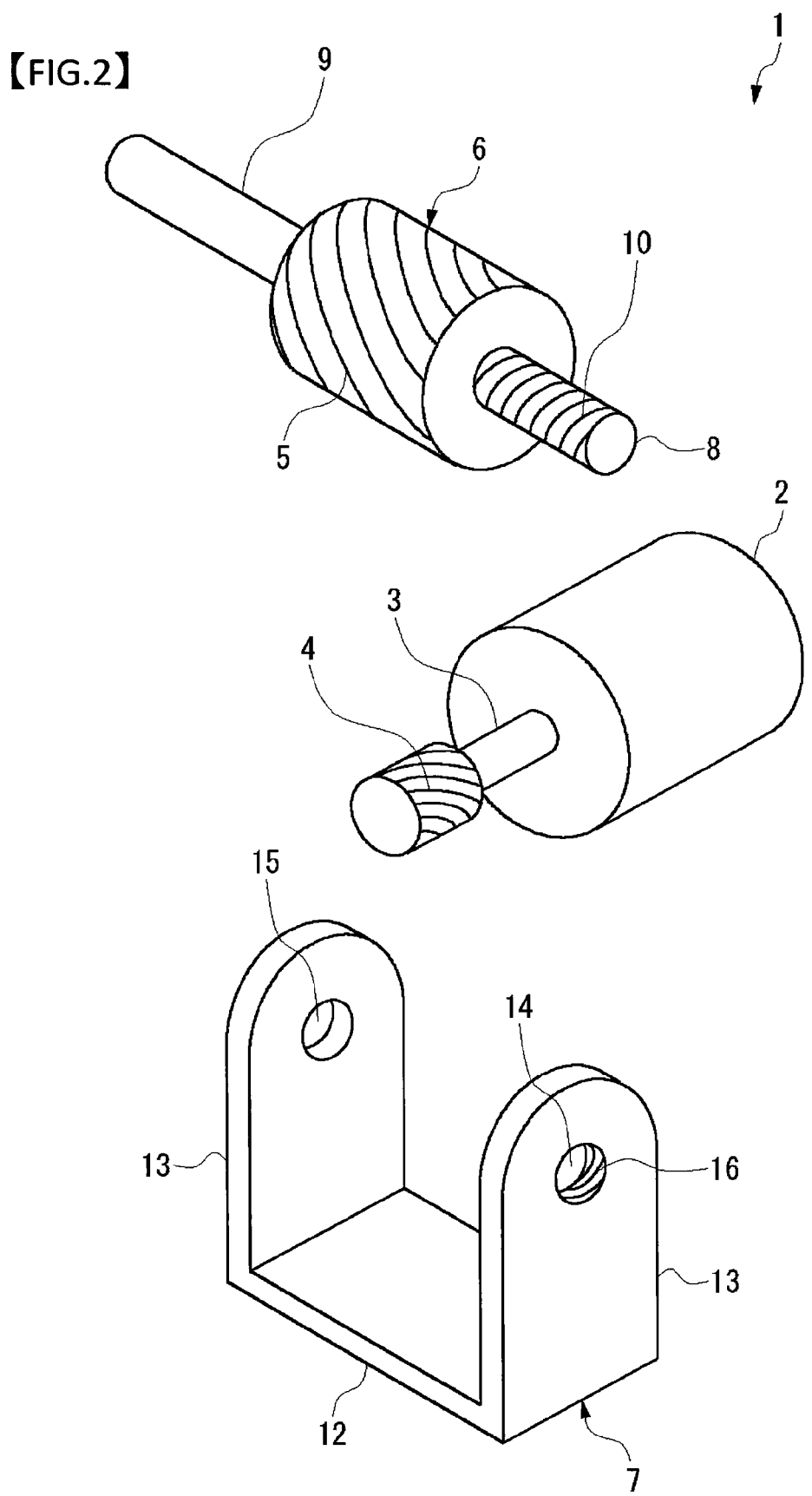

【FIG.3】
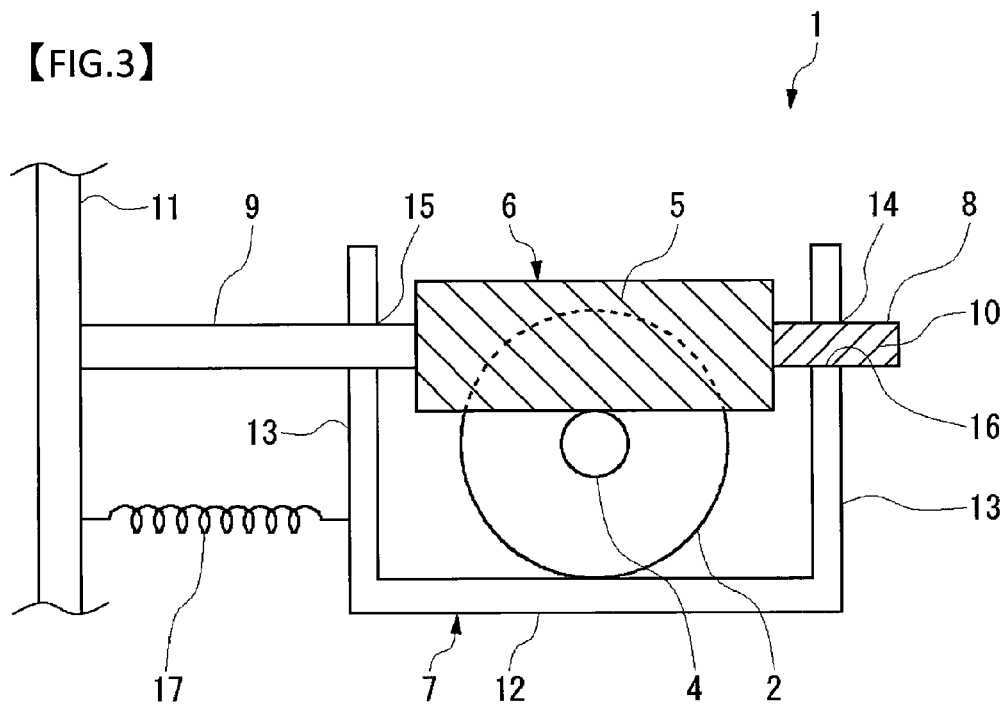
【FIG.4】
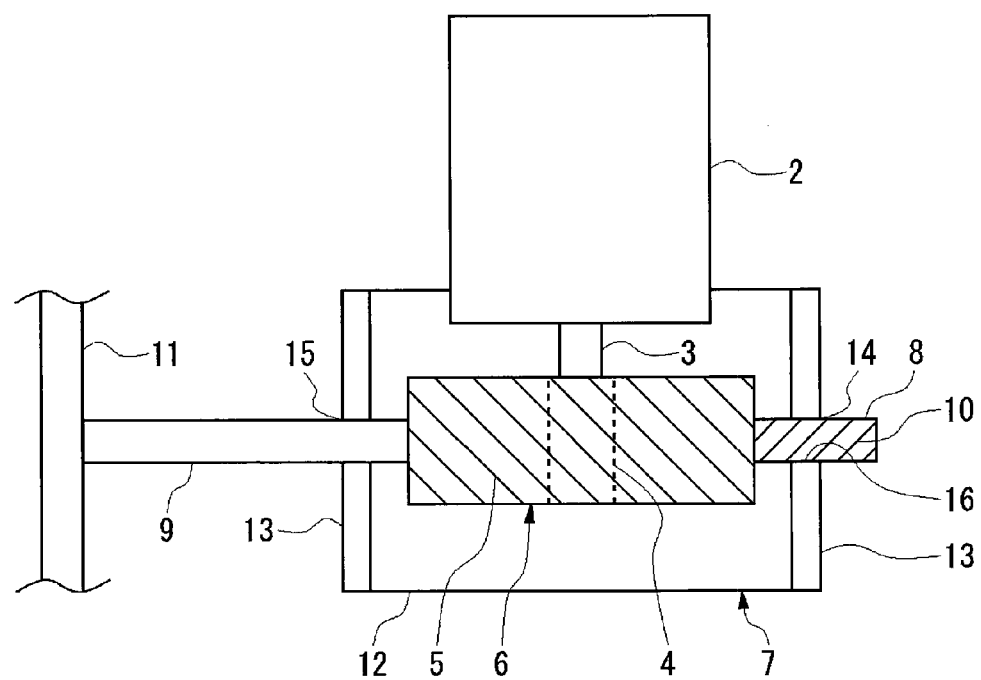

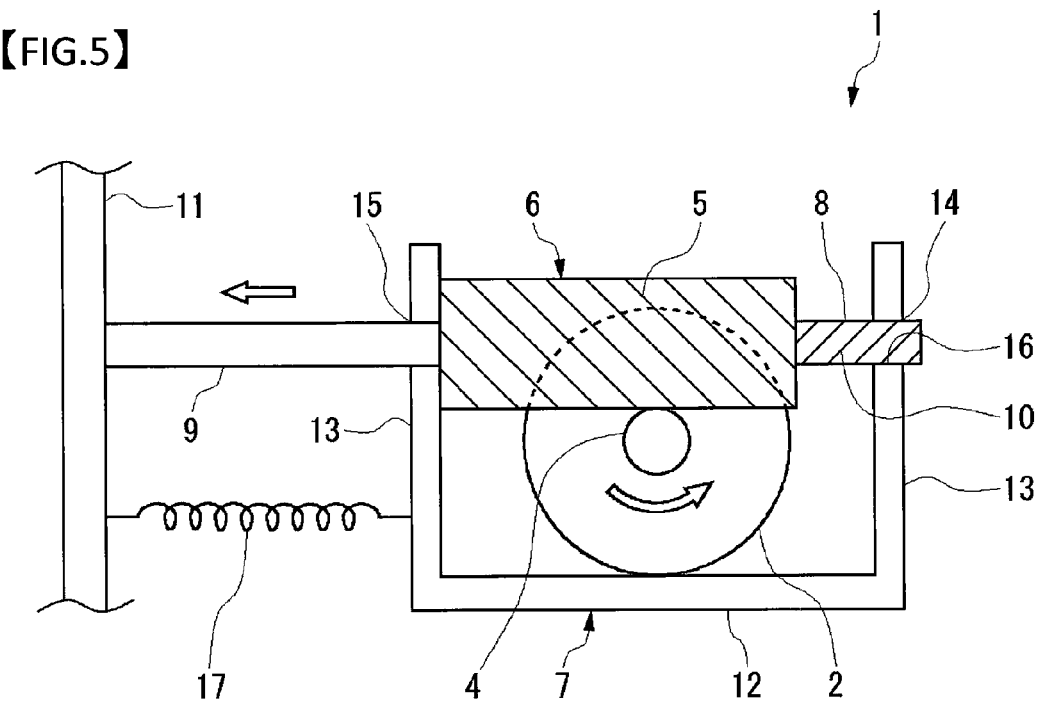
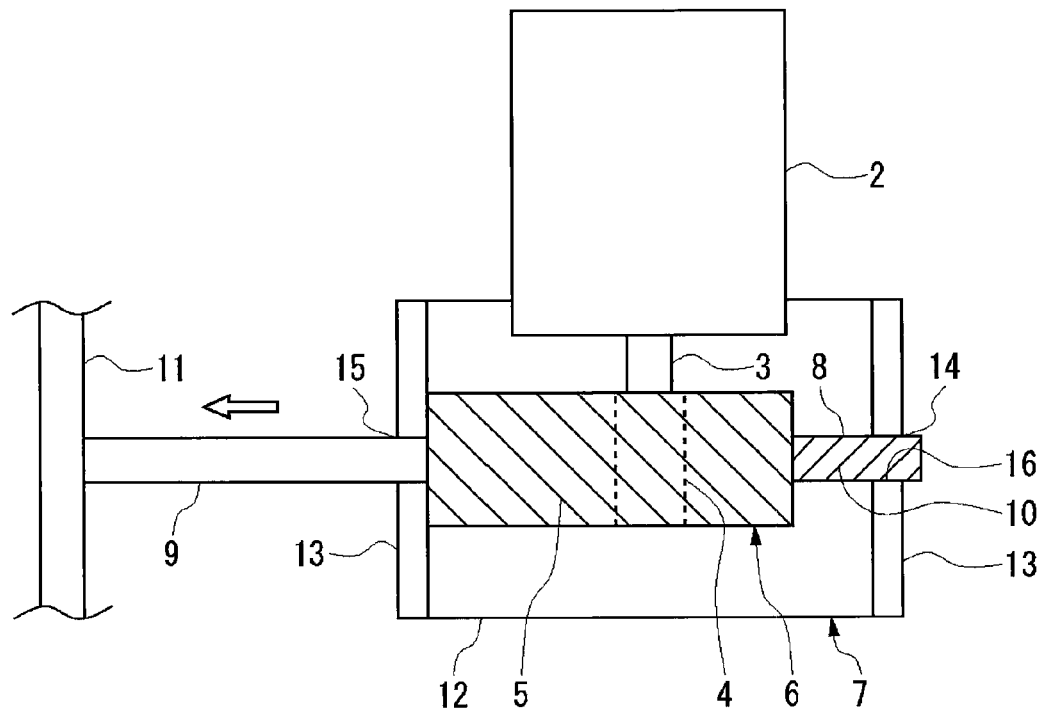

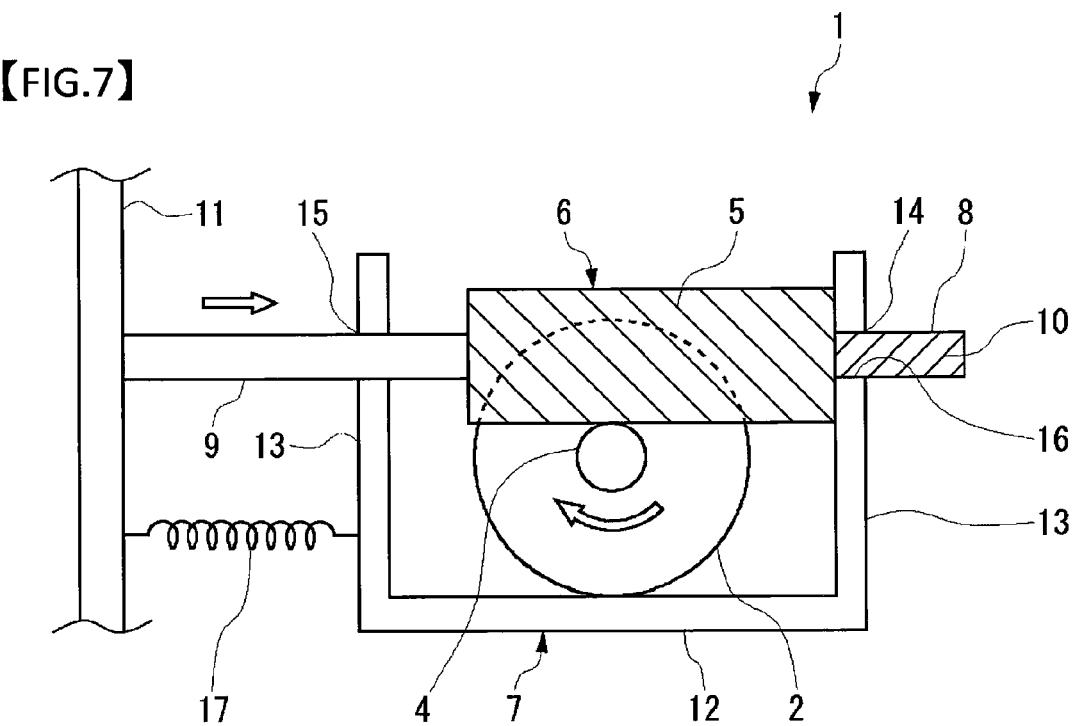
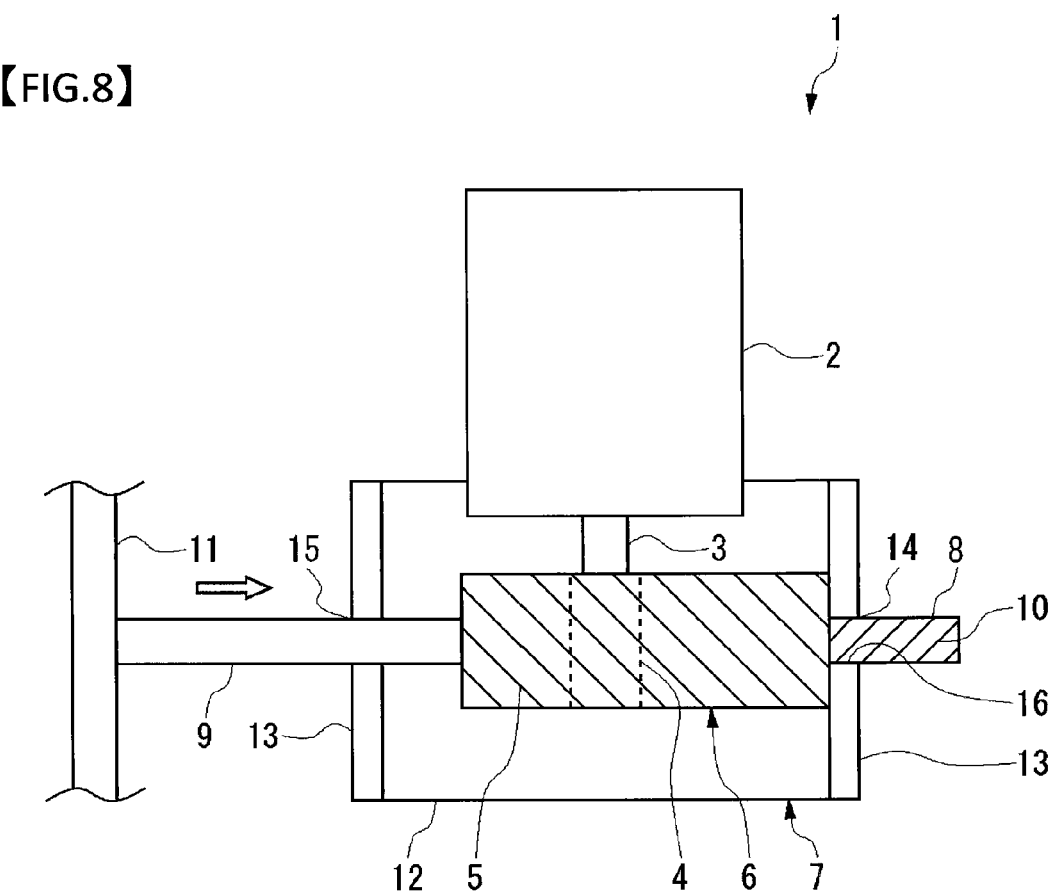

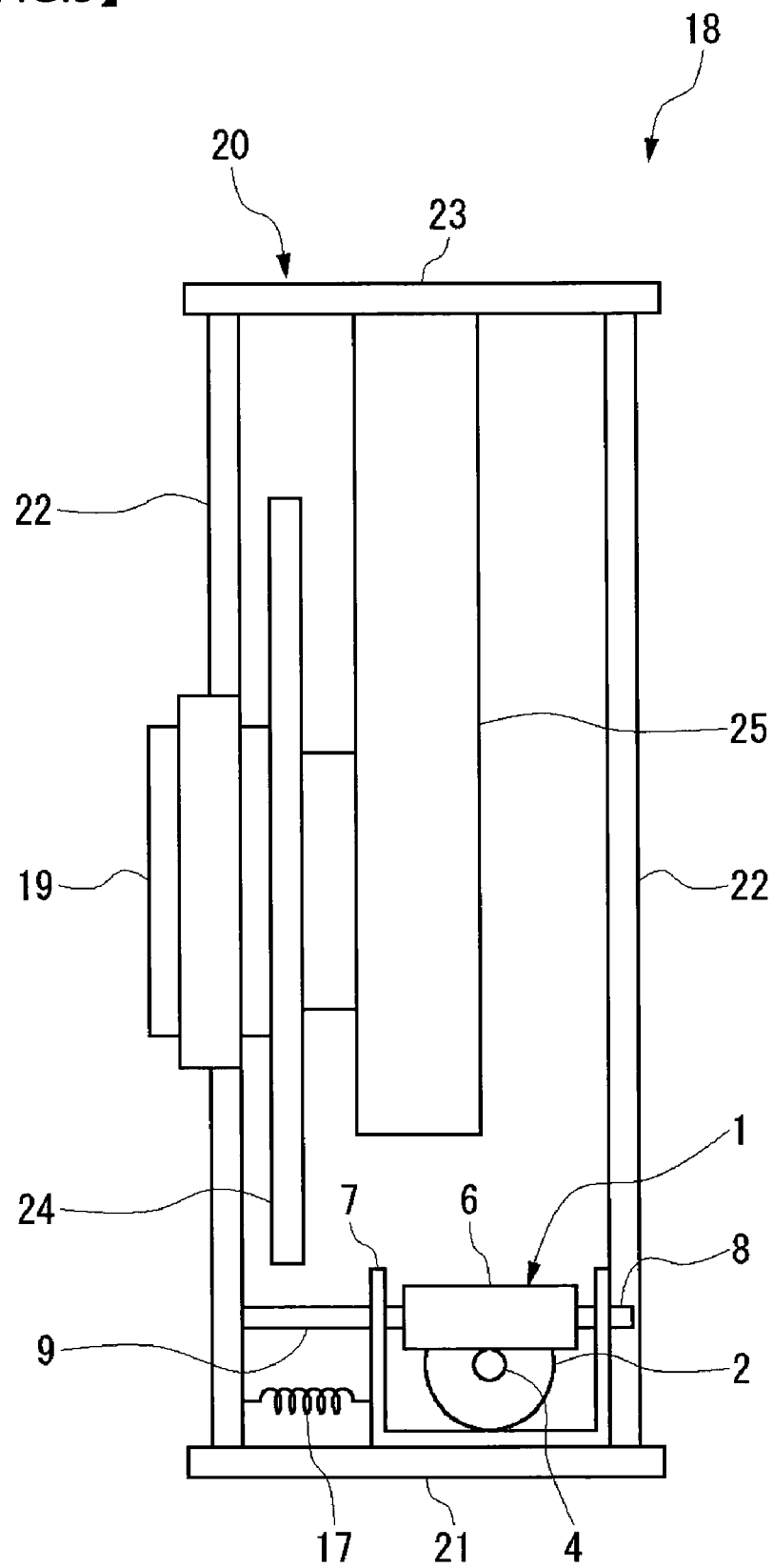
[FIG.9]

[FIG.10]
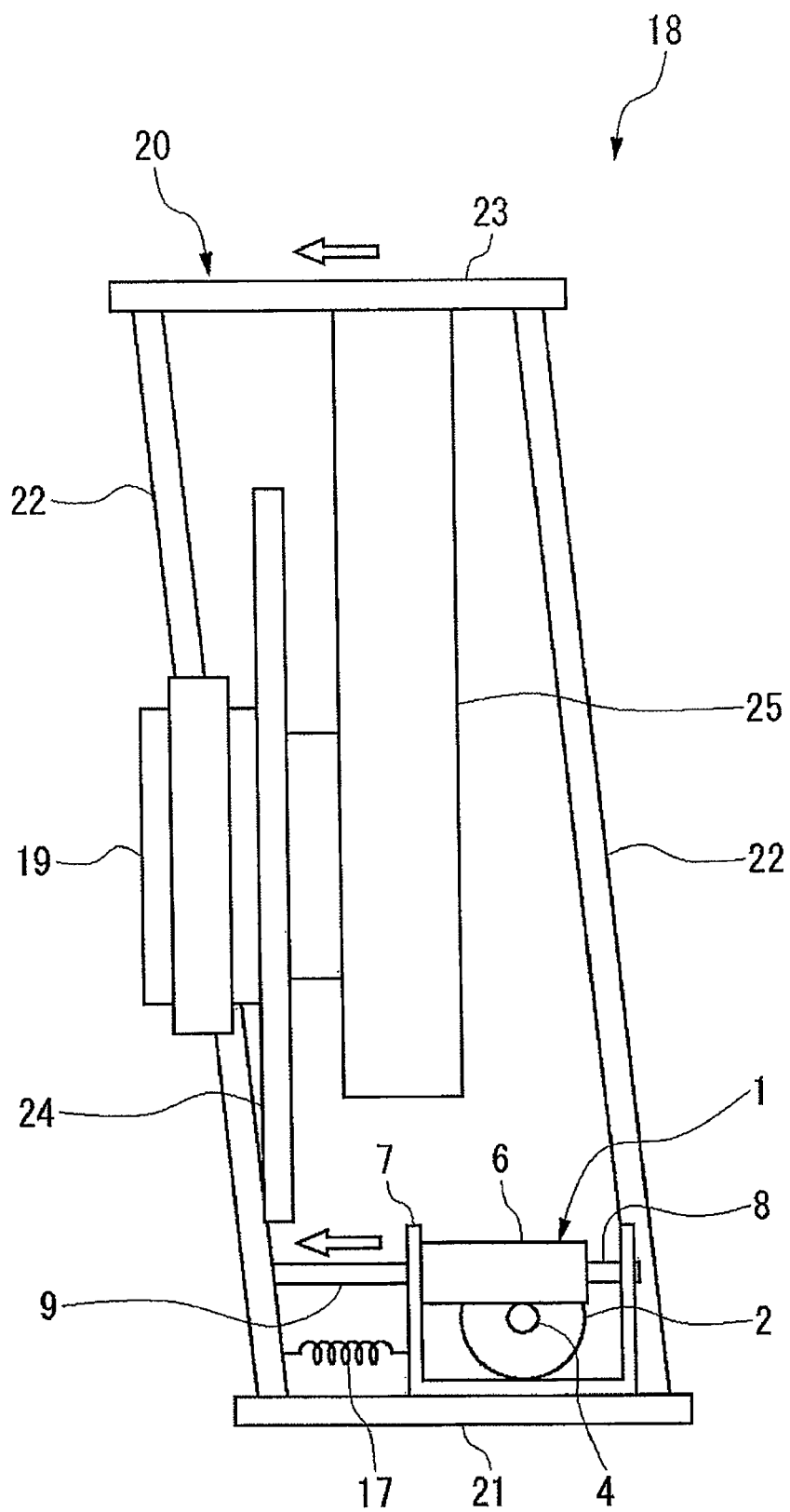

[FIG.11]
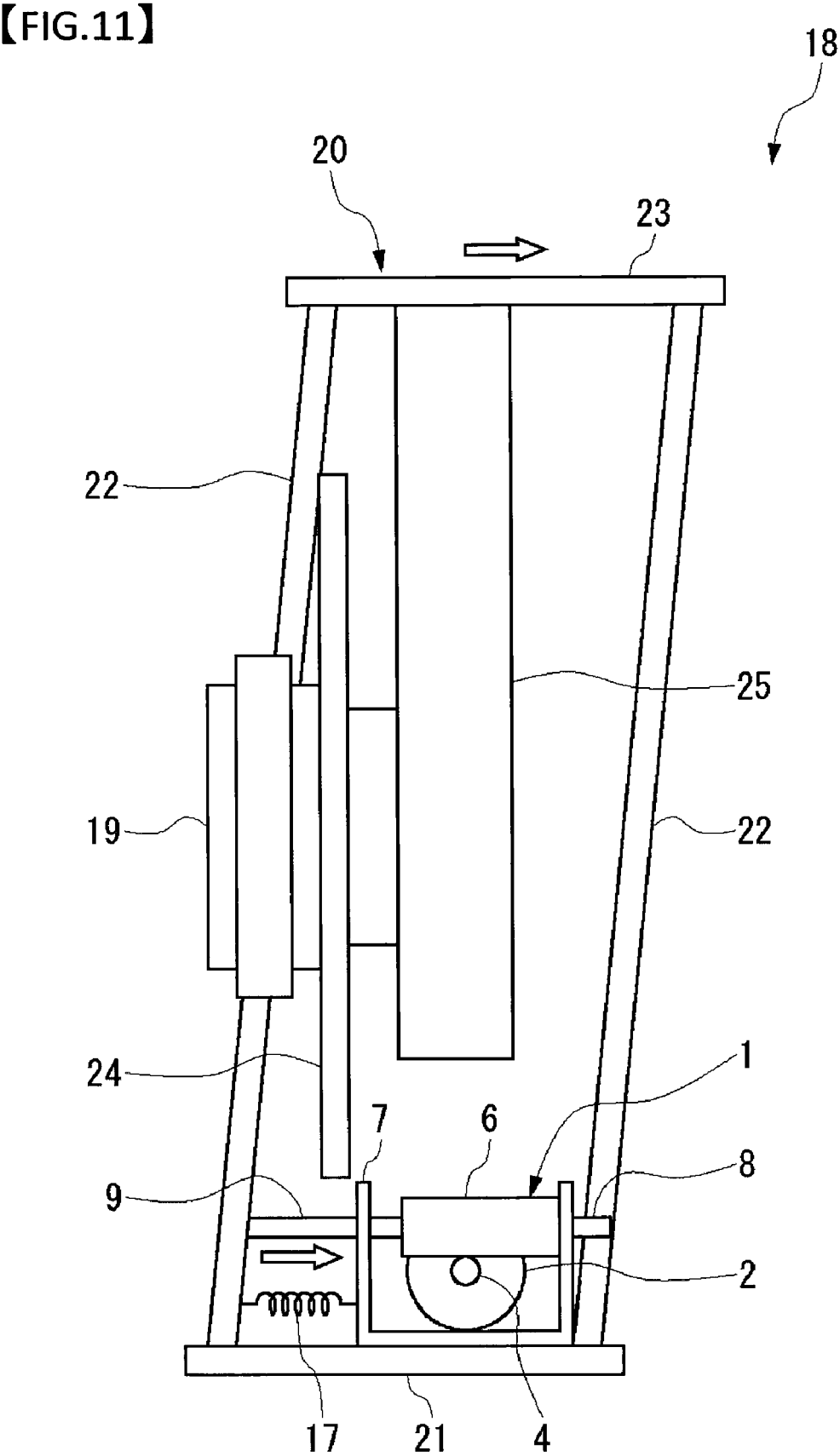

CAMERA DEVICE AND DRIVE MECHANISM

TECHNICAL FIELD

The present invention relates to a camera apparatus equipped with a drive mechanism which converts a rotational driving force of a drive source into a linear thrust force.

BACKGROUND ART

Among recent camera apparatuses, surveillance camera apparatuses are known which shoot surveillance video night and day. Such camera apparatuses use an IR cut filter (filter for color photography) for daylight photography and use optical glass corresponding to optical path length of the IR cut filter for night photography instead of using the IR cut filter. In the night, if there is axial chromatic aberration of a lens due to illumination or light containing infrared (IR) light, blurring will occur in the video when the IR cut filter is switched into and out of use. To deal with this, conventional camera apparatuses are equipped with an ABF (Auto Back Focus) mechanism which automatically adjusts focus by moving an image pickup element along an optical axis direction depending on whether an IR cut filter is used.

The ABF mechanism of conventional surveillance camera apparatuses uses a lead screw and stepping motor. The image pickup element is mounted on a nut rotatably engaged with the lead screw. The ABF mechanism moves the image pickup element forward and backward along the optical axis by rotating the lead screw using a rotational driving force of the stepping motor. For example, Japanese Patent Laid-Open No. 2003-274229 (pp. 3-5 and FIGS. 1 to 3) discloses such an ABF mechanism.

When size of the image pickup element is increased, a larger thrust force becomes necessary. However, with the ABF mechanism of the conventional camera apparatuses, when the rotational driving force of the stepping motor is converted into a thrust force along the optical axis, the resulting thrust force is not sufficiently large. To obtain a thrust force large enough to move the image pickup element along the optical axis, it is necessary to use a large stepping motor which develops a large rotational driving force. This makes it difficult to reduce the size and cost of the apparatuses. Also, the ABF mechanism of the conventional camera apparatuses finely adjusts an amount of travel along the optical axis by finely adjusting a rotation amount of the stepping motor, but there is a limit to the amount which can be adjusted using the stepping motor, making it difficult to more finely adjust the amount of travel.

DISCLOSURE OF THE INVENTION

Problems to be Solved by the Invention

The present invention has been made in view of the above circumstances. An object of the present invention is to provide a camera apparatus equipped with a drive mechanism which can develop a large thrust force and finely adjust an amount of travel.

Means for Solving the Problems

A according to one aspect of the present invention, there is provided a camera apparatus equipped with a drive mechanism which converts a rotational driving force of a drive source into a linear thrust force, including: a drive gear to which the rotational driving force of the drive source is transmitted; a driven member around which a helical gear is formed to engage with the drive gear and to which a rotational driving force of the drive gear is transmitted with reduced gear ratio; a support unit which supports the driven member rotatably around a rotation axis of the driven member and movably along the rotation axis; and a conversion unit which converts the rotational driving force transmitted to the driven member into a linear thrust force along the rotation axis so that the driven member moves along the rotation axis as the driven member rotates.

A according to another aspect of the present invention, there is provided a drive mechanism which, being mounted on a camera apparatus, converts a rotational driving force of a drive source into a linear thrust force, including: a drive gear to which the rotational driving force of the drive source is transmitted; a driven member around which a helical gear is formed to engage with the drive gear and to which a rotational driving force of the drive gear is transmitted with reduced gear ratio; a support unit which supports the driven member rotatably around a rotation axis of the driven member and movably along the rotation axis; and a conversion unit which converts the rotational driving force transmitted to the driven member into a linear thrust force along the rotation axis so that the driven member moves along the rotation axis as the driven member rotates.

As described below, the present invention has other aspects. Thus, the disclosure of the present invention is intended to provide some aspects of the present invention and is not intended to limit the scope of the invention described and claimed herein.

BRIEF DESCRIPTION OF THE DRAWINGS

FIG. 1 is a perspective view of a drive mechanism of a camera apparatus according to an embodiment of the present invention;

FIG. 2 is an exploded perspective view of the drive mechanism according to the embodiment of the present invention;

FIG. 3 is a side view for illustrating the drive mechanism according to the embodiment of the present invention;

FIG. 4 is a plan view for illustrating the drive mechanism according to the embodiment of the present invention;

FIG. 5 is a side view for illustrating the drive mechanism (with a worm wheel moved leftward) according to the embodiment of the present invention;

FIG. 6 is a plan view for illustrating the drive mechanism (with the worm wheel moved leftward) according to the embodiment of the present invention;

FIG. 7 is a side view for illustrating the drive mechanism (with the worm wheel moved rightward) according to the embodiment of the present invention;

FIG. 8 is a plan view for illustrating the drive mechanism (with the worm wheel moved rightward) according to the embodiment of the present invention;

FIG. 9 is a side view for illustrating an ABF mechanism of the camera apparatus according to the embodiment of the present invention;

FIG. 10 is a side view for illustrating the ABF mechanism of the camera apparatus (with an image pickup element moved forward) according to the embodiment of the present invention; and FIG. 11 is a side view for illustrating the ABF mechanism of the camera apparatus (with the image pickup element moved backward) according to the embodiment of the present invention.

DESCRIPTION OF SYMBOLS

1 Drive mechanism
2 Drive motor
4 Worm gear
5 Helical gear
6 Worm wheel

7 Support frame
8, 9 Shaft portion
10 Externally threaded portion
14, 15 Supporting hole
16 Internally threaded portion
18 ABF mechanism

BEST MODE FOR CARRYING OUT THE
INVENTION

The present invention will be described below in detail. However, it should be noted that the detailed description provided below and accompanying drawings are not intended to limit the invention. Instead, the scope of the present invention is defined by the appended claims.

A camera apparatus according the present invention is equipped with a drive mechanism which converts a rotational driving force of a drive source into a linear thrust force. The camera apparatus includes: a drive gear to which the rotational driving force of the drive source is transmitted; a driven member around which a helical gear is formed to engage with the drive gear and to which a rotational driving force of the drive gear is transmitted with reduced gear ratio; a support unit which supports the driven member rotatably around a rotation axis of the driven member and movably along the rotation axis; and a conversion unit which converts the rotational driving force transmitted to the driven member into a linear thrust force along the rotation axis so that the driven member moves along the rotation axis as the driven member rotates.

With this configuration, when the rotational driving force is transmitted from the drive gear to the driven member, the driven member moves along the rotation axis while rotating. In so doing, the rotational driving force of the drive gear is transmitted to the driven member with the gear ratio reduced greatly via the helical gear. In this way, since the rotational driving force whose gear ratio has been reduced greatly is converted into a thrust force, the resulting thrust force is larger than conventionally possible. Also, to finely adjust an amount of travel along an optical axis, the rotational driving force of the drive gear is transmitted to the driven member with the gear ratio reduced greatly. Thus, when a rotation amount of the drive source (e.g., stepping motor) is finely adjusted, the amount of travel can be adjusted more finely than conventionally possible.

In the camera apparatus according the present invention, the conversion unit may include a first threaded portion installed on the driven member; and a second threaded portion installed on the support unit and engaged with the first threaded portion.

With this configuration, since the first threaded portion of the driven member and second threaded portion of the support unit are engaged with each other, when the driven member rotates, the driven member is guided to move along the rotation axis. Consequently, the rotational driving force transmitted to the driven member is converted into a linear thrust force along the rotation axis.

Also, in the camera apparatus according the present invention, a thread direction of the first threaded portion with respect to the second threaded portion may be set such that a direction of an auxiliary thrust force along the rotation axis matches a direction of the linear thrust force along the rotation axis, the auxiliary thrust force being received by the driven member from the drive gear via the helical gear when the rotational driving force is transmitted to the driven member from the drive gear and the linear thrust force resulting from the conversion performed by the conversion unit when the driven member rotates.

With this configuration, the auxiliary thrust force received from the drive gear by the driven member is added to the thrust force resulting from the conversion performed by the conversion unit when the driven member rotates. Consequently, a larger thrust force can be obtained using the force transmitted from the drive gear.

Also, in the camera apparatus according the present invention, the helical gear of the driven member may have a gear width corresponding to an amount of travel of the driven member along the rotation axis and a shaft portion which is a supported unit of the driven member may have a shaft length corresponding to the amount of travel of the driven member along the rotation axis.

With this configuration, since the helical gear has a sufficient gear width, even when the driven member rotates and moves along the rotation axis, the drive gear remains in engage with the helical gear. Also, since the shaft portion of the driven member has a sufficient shaft length, even when the driven member rotates and moves along the rotation axis, the driven member remains supported by the support unit.

A drive mechanism according to the present invention converts a rotational driving force of a drive source into a linear thrust force by being mounted on a camera apparatus. The drive mechanism includes a drive gear to which the rotational driving force of the drive source is transmitted; a driven member around which a helical gear is formed to engage with the drive gear and to which a rotational driving force of the drive gear is transmitted; a support unit which supports the driven member rotatably around a rotation axis of the driven member and movably along the rotation axis; and a conversion unit which converts the rotational driving force transmitted to the driven member into a linear thrust force along the rotation axis so that the driven member moves along the rotation axis as the driven member rotates.

With this configuration again, as above, when the rotational driving force is transmitted from the drive gear to the driven member, the driven member moves along the rotation axis while rotating. In so doing, the rotational driving force of the drive gear is transmitted to the driven member with the gear ratio reduced greatly via the helical gear. In this way, since the rotational driving force whose gear ratio has been reduced greatly is converted into a thrust force, the resulting thrust force is larger than conventionally possible. Also, to finely adjust an amount of travel along an optical axis, the rotational driving force of the drive gear is transmitted to the driven member with the gear ratio reduced greatly. Thus, when a rotation amount of the drive source (e.g., stepping motor) is finely adjusted, the amount of travel can be adjusted more finely than conventionally possible.

Being equipped with the drive mechanism which includes the driven member to which the rotational driving force of the drive gear is transmitted with the gear ratio reduced, the support unit which supports the driven member rotatably and movably along the rotation axis, and the conversion unit which converts the rotational driving force transmitted to the driven member into a linear thrust force along the rotation axis, the present invention makes it possible to develop a larger thrust force and adjust the amount of travel more finely.

The camera apparatus and drive mechanism according to the embodiment of the present invention will be described below with reference to the drawings. In the present embodiment, an ABF drive mechanism of a surveillance camera apparatus will be described by way of example.

(Drive Mechanism)

First, the drive mechanism of the camera apparatus according to the present embodiment will be described below with reference to FIGS. 1 to 8. FIG. 1 is a perspective view showing an overall configuration of the drive mechanism according to the present embodiment. FIG. 2 is an exploded perspective view showing components of the drive mechanism. FIG. 3 is a side view for illustrating the configuration of the drive mechanism and FIG. 4 is a plan view for illustrating the configuration of the drive mechanism.

As shown in FIGS. 1 to 4, the drive mechanism 1 according to the present embodiment includes a drive motor 2 (e.g., stepping motor), a worm gear 4 mounted on a motor shaft portion 3 of the drive motor 2, a worm wheel 6 around which a helical gear 5 is formed to engage with the worm gear 4, and a support frame 7 which supports the worm wheel 6 rotatably and movably along the rotation axis. The drive motor 2 is an example of the drive source according to the present invention. Also, the worm gear 4 is an example of the drive gear according to the present invention and the worm wheel 6 is an example of the driven member according to the present invention. The support frame 7 is an example of the support unit according to the present invention.

As shown in FIGS. 1 and 2, the worm wheel 6 is approximately cylindrical in shape. A pair of shaft portions 8 and 9 extend from opposite sides of the worm wheel 6. An externally threaded portion 10 is formed around a first shaft portion 8. On the other hand, a tip of the second shaft portion 9 abuts an object 11 (hereinafter simply referred to also as the object 11) to which a thrust force is applied by the drive mechanism 1. The externally threaded portion 10 of the first shaft portion 8 is an example of the first threaded portion according to the present invention.

The support frame 7 is approximately U-shaped and is made up of a horizontal plate 12 and two vertical plates 13. The vertical plates 13 have respective supporting holes 14 and 15 through which the shaft portions 8 and 9 of the worm wheel 6 are passed, respectively. An internally threaded portion 16 is formed on an inner surface of a first supporting hole 14 (supporting hole 14 through which the first shaft portion 8 is passed) to engage with the externally threaded portion 10 of the shaft portion 8. The internally threaded portion 16 of the supporting hole 14 is an example of the second threaded portion according to the present invention.

One end of a spring member 17 is attached to the other vertical plate 13 of the support frame 7 (the vertical plate 13 provided with the supporting hole 15 through which the second shaft portion 9 is passed). The other end of the spring member 17 is attached to the object to be moved. The object to be moved is pulled toward the second shaft portion 9 by a restoring force of the spring member 17. Thus, the tip of the second shaft portion 9 constantly abuts the object 11.

Since the internally threaded portion 16 of the first supporting hole 14 is engaged with the externally threaded portion 10 of the shaft portion 8 as described above, when the worm wheel 6 rotates, the worm wheel 6 moves along the rotation axis (in a right/left direction in FIG. 3) accordingly. That is, the rotational driving force transmitted to the worm wheel 6 is converted into a linear thrust force along the rotation axis by the externally threaded portion 10 of the shaft portion 8 and internally threaded portion 16 of the supporting hole 14. The externally threaded portion 10 and internally threaded portion 16 are examples of the conversion unit according to the present invention.

Now, the thread direction of the externally threaded portion 10 of the shaft portion 8 will be described. The thread direction of the externally threaded portion 10 of the shaft portion 8 with respect to the internally threaded portion 16 of the supporting hole 14 is set such that the direction of a thrust force (auxiliary thrust force) along the rotation axis received by the worm wheel 6 from the worm gear 4 via the helical gear 5 when the rotational driving force is transmitted to the worm wheel 6 from the worm gear 4 will match the direction of the thrust force along the rotation axis resulting from the conversion performed by the externally threaded portion 10 of the shaft portion 8 and internally threaded portion 16 of the supporting hole 14 when the worm wheel 6 rotates.

Referring to FIG. 3, for example, when the worm gear 4 rotates in one direction (e.g., counterclockwise in FIG. 3), the worm wheel 6 rotates in one direction (e.g., to the left) as a result. In so doing, the worm wheel 6 receives an auxiliary thrust force along the rotation axis (e.g., leftward) from the worm gear 4. In this case, the thread direction of the externally threaded portion 10 of the shaft portion 8 is set such that when the worm wheel 6 rotates to the left, the worm wheel 6 will receive a thrust force pointed in the same direction (leftward). That is, the externally threaded portion 10 of the shaft portion 8 is set to behave as a so-called left-hand screw.

The thread direction of the externally threaded portion 10 of the shaft portion 8 with respect to the internally threaded portion 16 of the supporting hole 14 may also be configured such that the direction of the thrust force (auxiliary thrust force) along the rotation axis received by the worm wheel 6 from the worm gear 4 via the helical gear 5 will be opposite to the direction of the thrust force along the rotation axis resulting from the conversion performed by the externally threaded portion 10 of the shaft portion 8 and internally threaded portion 16 of the supporting hole 14.

That is, when the worm wheel 6, which receives the auxiliary thrust force from the worm gear 4 as described above, receives drag (a force in the opposite direction) larger than the auxiliary thrust force, the worm wheel 6 moves in the opposite direction against the auxiliary thrust force while rotating. In this case, since the thrust force along the rotation axis resulting from the conversion performed by the externally threaded portion 10 of the shaft portion 8 and internally threaded portion 16 of the supporting hole 14 is larger than the auxiliary thrust force, the present invention can also be implemented even if the auxiliary thrust force is opposite in direction. However, when the auxiliary thrust force is opposite in direction to the thrust force along the rotation axis resulting from the conversion performed by the externally threaded portion 10 of the shaft portion 8 and internally threaded portion 16 of the supporting hole 14, a total resultant thrust force obtainable is smaller.

Incidentally, when the worm wheel 6 experiences drag (a force in the opposite direction) equal in magnitude to the auxiliary thrust force, the worm wheel 6 slips and rotates in place without moving along the rotation axis.

Besides, the helical gear 5 of the worm wheel 6 has a gear width corresponding to the amount of travel of the worm wheel 6. That is, the helical gear 5 has a width large enough for the helical gear 5 to be in constant engage with the worm gear 4 even when the worm wheel 6 moves along the rotation axis as described above (see FIGS. 5 to 8).

For example, the helical gear 5 has a width large enough for the helical gear 5 to remain in engage with the worm gear 4 even when the worm wheel 6 moves toward the second shaft portion 9 (e.g., leftward) (see FIGS. 5 and 6). Also, the helical gear 5 has a width large enough for the helical gear 5 to remain in engage with the worm gear 4 even when the worm wheel 6 moves toward the first shaft portion 8 (e.g., rightward) (see FIGS. 7 and 8).

Also, the shaft portions 8 and 9 of the worm wheel 6 have shaft lengths corresponding to the amount of travel of the worm wheel 6. That is, the shaft portions 8 and 9 of the worm wheel 6 have lengths long enough for the shaft portions 8 and 9 to be constantly supported in the supporting holes 14 and 15 even when the worm wheel 6 moves along the rotation axis as described above (see FIGS. 5 to 8).

For example, the first shaft portion 8 has a length long enough to keep the first shaft portion 8 from falling off the supporting hole 14 even when the worm wheel 6 moves toward the second shaft portion 9 (e.g., leftward) (see FIGS. 5 and 6). Also, the second shaft portion 9 has a length long enough to keep the second shaft portion 9 from falling off the supporting hole 15 even when the worm wheel 6 moves toward the first shaft portion 8 (e.g., rightward) (see FIGS. 7 and 8).

Operation of the drive mechanism 1 configured as described above will be described with reference to FIGS. 5 to 8.

First, description will be given of the operation of pushing out the second shaft portion 9, i.e., the operation of moving the worm wheel 6 leftward. FIG. 5 is a side view of the drive mechanism 1 with the worm wheel 6 moved leftward. FIG. 6 is a plan view of the drive mechanism 1 with the worm wheel 6 moved leftward.

As shown in FIGS. 5 and 6, to push out the second shaft portion 9, the drive mechanism 1 according to the present embodiment rotates the worm gear 4 in one direction (e.g., counterclockwise in FIG. 5) by operating the drive motor 2. Consequently, the rotational driving force is transmitted via the helical gear 5, thereby rotating the worm wheel 6 in one direction (e.g., to the left). The rotational driving force is converted into a thrust force along the rotation axis (e.g., leftward) by the externally threaded portion 10 of the shaft portion 8 and internally threaded portion 16 of the supporting hole 14, and the worm wheel 6 receives a leftward thrust force. Also, the worm wheel 6 receives an auxiliary thrust force in the same direction (leftward) from the worm gear 4. Incidentally, the worm wheel 6 receives a restoring force in the opposite direction (rightward) from the spring member 17, but the restoring force is smaller than the thrust force described above. Consequently, the worm wheel 6 moves leftward against the restoring force of the spring member 17, pushing out the second shaft portion 9.

Next, description will be given of the operation of pulling in the second shaft portion 9, i.e., the operation of moving the worm wheel 6 rightward. FIG. 7 is a side view of the drive mechanism 1 with the worm wheel 6 moved rightward. FIG. 8 is a plan view of the drive mechanism 1 with the worm wheel 6 moved rightward.

As shown in FIGS. 7 and 8, to pull in the second shaft portion 9, the drive mechanism 1 according to the present embodiment rotates the worm gear 4 in the opposite direction (e.g., clockwise in FIG. 7) by operating the drive motor 2. Consequently, the rotational driving force is transmitted via the helical gear 5, thereby rotating the worm wheel 6 in the opposite direction (e.g., to the right). The rotational driving force is converted into a thrust force in the opposite direction of the rotation axis (e.g., rightward) by the externally threaded portion 10 of the shaft portion 8 and internally threaded portion 16 of the supporting hole 14, and the worm wheel 6 receives a rightward thrust force. Also, the worm wheel 6 receives an auxiliary thrust force in the same direction (rightward) from the worm gear 4. Incidentally, the worm wheel 6 receives a restoring force in the same direction (rightward) from the spring member 17. Consequently, the worm wheel 6 moves rightward, pulling in the second shaft portion 9.

(ABF Mechanism)

The drive mechanism 1 according to the present embodiment described above is used, for example, as a drive mechanism 1 for ABF. An ABF mechanism 18 according to the present embodiment will be described below with reference to FIGS. 9 to 11.

FIG. 9 is a side view for illustrating the ABF mechanism 18 according to the present embodiment. As shown in FIG. 9, the camera apparatus contains an image pickup element 19 (e.g., CCD) placed on an optical path of a lens, an ABF frame 20 in which the image pickup element 19 is mounted, and the drive mechanism 1 described above, which moves the image pickup element 19 along an optical axis by deforming the ABF frame 20.

The ABF frame 20 includes a lower frame 21, a pair of front and rear vertical frames 22 placed on the lower frame 21, and an upper frame 23 supported by the vertical frames 22. A mounting frame 25 is suspended from the underside of the upper frame 23 to mount a mounting board 24 on which the image pickup element 19 and the like are mounted.

As shown in FIG. 9, one of the vertical frames 22 is abutted by the tip of the shaft portion 9 of the worm wheel 6 of the drive mechanism 1. For example, in the example shown in FIG. 9, the front vertical frame 22 (on the left side in FIG. 9) is abutted by the tip of the second shaft portion 9 of the worm wheel 6. In this case, the vertical frame 22 is the object 11 to which a thrust force is applied by the drive mechanism 1.

The ABF frame 20 is configured such that when a thrust force is applied by the drive mechanism 1, the vertical frames 22 will tilt forward or backward, causing the upper frame 23 to move forward or backward (along the optical axis) (see FIGS. 10 and 11). That is, the ABF frame 20 is configured to be able to move the image pickup element 19 forward and backward using the thrust force of the drive mechanism 1.

Operation of the ABF mechanism 18 configured as described above will be described with reference to FIGS. 10 to 11. FIG. 10 is a side view of the ABF mechanism 18 with the image pickup element 19 moved forward. FIG. 11 is a side view of the ABF mechanism 18 with the image pickup element 19 moved backward.

As shown in FIG. 10, to move the image pickup element 19 forward, the ABF mechanism 18 according to the present embodiment moves the worm wheel 6 leftward (leftward in FIG. 10) by operating the drive motor 2 as described above, and thereby pushes out the second shaft portion 9 of the worm wheel 6. Then, the ABF mechanism 18 pushes the vertical frames 22 using the second shaft portion 9, thereby deforms the ABF frame 20, and thereby moves the image pickup element 19 forward (to the left side in FIG. 10).

On the other hand, as shown in FIG. 11, to move the image pickup element 19 backward, the ABF mechanism 18 according to the present embodiment moves the worm wheel 6 rightward (rightward in FIG. 11) by operating the drive motor 2 as described above, and pulls in the second shaft portion 9 of the worm wheel 6. Then, the ABF mechanism 18 pulls the vertical frames 22 using the restoring force of the spring member 17, thereby deforms the ABF frame 20, and thereby moves the image pickup element 19 backward (to the right side in FIG. 11).

Thus, being equipped the drive mechanism 1 that includes the worm wheel 6 to which the rotational driving force of the worm gear 4 is transmitted with reduced gear ratio, the support frame 7 which supports the worm wheel 6 rotatably and movably along the rotation axis, and the externally threaded portion 10 of the shaft portion 8 and internally threaded portion 16 of the supporting hole 14 which together convert the rotational driving force transmitted to the worm wheel 6 into a linear thrust force along the rotation axis, the camera apparatus according to the present embodiment can develop a larger thrust force and adjust the amount of travel more finely.

That is, according to the present embodiment, when the rotational driving force is transmitted from the worm gear 4 to the worm wheel 6, the worm wheel 6 moves along the rotation axis while rotating. In so doing, the rotational driving force of the worm gear 4 is transmitted to the worm wheel 6, with its gear ratio reduced greatly via the helical gear 5. In this way, since the rotational driving force whose gear ratio has been reduced greatly is converted into a thrust force, the resulting thrust force is larger than conventionally possible. Also, to finely adjust the amount of travel along the optical axis, the rotational driving force of the worm gear 4 is transmitted to the worm wheel 6 with its gear ratio reduced greatly. Thus, when the rotation amount of the drive motor 2 (e.g., stepping motor) is finely adjusted, the amount of travel can be adjusted more finely than conventionally possible.

Also, according to the present embodiment, since the externally threaded portion 10 (first threaded portion) of the shaft portion 8 of the worm wheel 6 and internally threaded portion 16 (second threaded portion) of the supporting hole 14 are engaged with each other, when the worm wheel 6 rotates, the worm wheel 6 is guided to move along the rotation axis. In this way, the rotational driving force transmitted to the worm wheel 6 is converted into a linear thrust force along the rotation axis. That is to say, rotational motion around the rotation axis of the worm wheel 6 is converted into the linear motion along the rotation axis.

Also, according to the present embodiment, the auxiliary thrust force received from the worm gear 4 by the worm wheel 6 is added to the thrust force resulting from the conversion performed by the externally threaded portion 10 of the shaft portion 8 and internally threaded portion 16 of the supporting hole 14 when the worm wheel 6 rotates. This makes it possible to develop a large thrust force using the force transmitted from the worm gear 4 without waste.

Also, according to the present embodiment, since the helical gear 5 has a sufficient gear width, even when the worm wheel 6 rotates and moves along the rotation axis, the worm gear 4 is constantly engaged with the helical gear 5. Also, since the shaft portions 8 and 9 of the worm wheel 6 have sufficient shaft lengths, even when the worm wheel 6 rotates and moves along the rotation axis, the worm wheel 6 is supported by the support frame 7 firmly.

An embodiment of the present invention has been described above by way of example, but the scope of the present invention is not limited to the embodiment described above, and various changes and modifications can be made according to the intended use within the scope of the appended claims.

For example, a configuration in which the second shaft portion 9 of the worm wheel 6 simply abuts the object 11 (a vertical frame 22 of the ABF frame 20) has been illustrated as an example. That is, description has been given of an example in which the object 11 is caused to follow the worm wheel 6 by being pulled by the spring member 17. However, the scope of the present invention is not limited to this, and the worm wheel 6 may be made to follow the motion of object 11 with the object 11 fixed to the tip of the second shaft portion 9.

Also, although in the example described above, the externally threaded portion 10 is formed on the first shaft portion 8 of the worm wheel 6 while the internally threaded portion 16 is formed in the first supporting hole 14 of the support frame 7, the scope of the present invention is not limited to this. Alternatively, an externally threaded portion may be formed on the second shaft portion 9 of the worm wheel 6 and an internally threaded portion may be formed in the second supporting hole 15 of the support frame 7. Also, externally threaded portions may be formed on both shaft portions 8 and 9 of the worm wheel 6 and internally threaded portions may be formed in both supporting holes 14 and 15 of the support frame 7.

Although a currently conceivable preferred embodiment of the present invention has been described above, it should be understood that various modifications can be made to the present embodiment and that all such modifications within the spirit and scope of the present invention are included in the appended claims.

INDUSTRIAL APPLICABILITY

As described above, the camera apparatus according to the present invention has the advantage of being able to develop a larger thrust force and adjust the amount of travel more finely and is useful as a surveillance camera apparatus and the like equipped with an ABF drive mechanism.

The invention claimed is:

1. A camera apparatus comprising a drive mechanism which converts a rotational driving force of a drive source into a linear thrust force, wherein the camera apparatus comprises:
   an image pick up element provided on an ABF frame of the camera apparatus;
   a drive gear to which the rotational driving force of the drive source is transmitted;
   a driven member around which a helical gear is formed to engage with the drive gear and to which a rotational driving force of the drive gear is transmitted with reduced gear ratio;
   a support unit which supports the driven member rotatably around a rotation axis of the driven member and movably along the rotation axis; and
   a conversion unit which converts the rotational driving force transmitted to the driven member into a linear thrust force along the rotation axis so that the driven member moves along the rotation axis as the driven member rotates,
   wherein the conversion unit comprises:
   a first threaded portion which is provided with the driven member; and
   a second threaded portion which is provided with the support unit and is engaged with the first threaded portion,
   wherein the first threaded portion is provided on one end of the driven member and a shaft member is provided on the other end of the driven member, wherein the shaft member is abutted to the ABF frame, and
   the ABF frame tilts as the driven member moves along the rotation axis.

2. The camera apparatus according to claim 1, wherein a thread direction of the first threaded portion with respect to the second threaded portion is set such that a direction of an auxiliary thrust force along the rotation axis matches a direction of the linear thrust force along the rotation axis, the auxiliary thrust force being received by the driven member from the drive gear via the helical gear when the rotational driving force is transmitted to the driven member from the drive gear, and the linear thrust force resulting from the conversion performed by the conversion unit when the driven member rotates.

3. The camera apparatus according to claim 1, wherein the helical gear of the driven member has a gear width corresponding to an amount of travel of the driven member along the rotation axis, and a shaft portion which is a supported unit of the driven member has a shaft length corresponding to the amount of travel of the driven member along the rotation axis.

4. The camera apparatus according to claim 1, wherein the shaft member pushes the ABF frame away from the support unit by the linear thrust force along the rotation axis, and the image pickup element moves forward.

5. The camera apparatus according to claim 1, further comprises a spring member attached between the support unit and the ABF frame.

6. The camera apparatus according to claim 5, wherein the spring member pulls the ABF frame toward the support unit by a restoring force, and the image pickup element moves backward.

7. The camera apparatus according to claim 6, wherein the drive source rotates the drive gear only to one direction to push the ABF frame away from the support unit.

8. The camera apparatus according to claim 7, wherein the restoring force of the spring member is smaller than the linear thrust force.

9. A drive mechanism which is mounted on a camera apparatus and converts a rotational driving force of a drive source into a linear thrust force, wherein the drive mechanism comprises:
   a drive gear to which the rotational driving force of the drive source is transmitted;
   a driven member around which a helical gear is formed to engage with the drive gear and to which a rotational driving force of the drive gear is transmitted with reduced gear ratio;
   a support unit which supports the driven member rotatably around a rotation axis of the driven member and movably along the rotation axis;
   a conversion unit which converts the rotational driving force transmitted to the driven member into a linear thrust force along the rotation axis so that the driven member moves along the rotation axis as the driven member rotates; and
   a spring member attached between the support unit and an object to be moved,
   wherein the conversion unit comprises:
   a first threaded portion which is provided with the driven member; and
   a second threaded portion which is provided with the support unit and is engaged with the first threaded portion.

10. The drive mechanism according to claim 9, wherein the spring member pulls the object to be moved toward the support unit by a restoring force.

11. The drive mechanism according to claim 10, wherein the drive source rotates the drive gear only to one direction to push the object to be moved away from the support unit.

12. The drive mechanism according to claim 10, wherein the restoring force of the spring member is smaller than the linear thrust force.

13. The drive mechanism according to claim 9, wherein the support unit is substantially U-shaped monolithic member comprising two vertical plates and one horizontal plate provided between the two vertical plates, and the second threaded portion is directly engraved in one of the two vertical plates.

14. The drive mechanism according to claim 9, wherein the first threaded portion is provided on one end of the driven member and a shaft member is provided on the other end of the driven member, the shaft member is abutted to the object to be moved.

15. The drive mechanism according to claim 14, wherein the shaft member pushes the object to be moved away from the support unit by the linear thrust force along the rotation axis.

* * * * *

UNITED STATES PATENT AND TRADEMARK OFFICE
CERTIFICATE OF CORRECTION

PATENT NO.      : 8,322,934 B2
APPLICATION NO. : 12/667100
DATED           : December 4, 2012
INVENTOR(S)     : Jyouji Wada et al.

It is certified that error appears in the above-identified patent and that said Letters Patent is hereby corrected as shown below:

In column 1, line 60, please delete "A according" and instead insert --According--

In column 2, line 8, please delete "A according" and instead insert --According--

Signed and Sealed this
Fifth Day of March, 2013

Teresa Stanek Rea
*Acting Director of the United States Patent and Trademark Office*